United States Patent [19]
Giacobbe et al.

[11] Patent Number: 5,641,848
[45] Date of Patent: Jun. 24, 1997

[54] POLYPROPYLENE BLOWN FILM

[75] Inventors: James M. Giacobbe, Stillpond, Md.; Steven J. Pufka, Newark, Del.

[73] Assignee: Montell North America Inc., Wilmington, Del.

[21] Appl. No.: 505,925

[22] Filed: Jul. 24, 1995

[51] Int. Cl.$^6$ .......................... C08F 110/06; C08L 23/10; C08L 53/00
[52] U.S. Cl. .................. 526/348.1; 526/351; 525/88; 525/95; 525/232; 525/240; 525/321; 525/322; 525/323
[58] Field of Search ................ 526/348.1, 351; 525/232, 240, 88, 95, 321, 322, 323

[56] References Cited

U.S. PATENT DOCUMENTS

| | | | |
|---|---|---|---|
| 4,185,148 | 1/1980 | Sato et al. | 526/348.1 |
| 4,283,463 | 8/1981 | Shiga et al. | 526/348.1 X |
| 4,705,828 | 11/1987 | Matsumoto et al. | 526/348.1 X |
| 4,814,135 | 3/1989 | Heitz | 526/348.1 X |
| 5,212,246 | 5/1993 | Ogale | 525/240 |
| 5,286,791 | 2/1994 | DeNicola, Jr. et al. | 525/71 |
| 5,300,365 | 4/1994 | Ogale | 428/461 |
| 5,318,842 | 6/1994 | Ogale | 428/349 |
| 5,409,992 | 4/1995 | Eppert, Jr. | 525/88 |

FOREIGN PATENT DOCUMENTS

| | | |
|---|---|---|
| 573862 | 12/1993 | European Pat. Off. . |
| 651010 | 5/1995 | European Pat. Off. . |

*Primary Examiner*—Fred Teskin

[57] ABSTRACT

Disclosed is a blown film or sheet material comprising a broad molecular weight distribution propylene polymer material having a molecular weight distribution $M_w/M_n$ of about 4 to about 60, a melt flow rate of about 0.5 to about 50 dg/min, and xylene insolubles at 25° C. of greater than or equal to 94%. A mixture of the broad molecular weight distribution propylene polymer material and a heterophasic olefin polymer composition can also be used.

4 Claims, No Drawings

POLYPROPYLENE BLOWN FILM

FIELD OF THE INVENTION

This invention relates to blown thermoplastic films or sheets prepared from a broad molecular weight distribution propylene polymer material.

BACKGROUND OF THE INVENTION

Propylene homopolymers have been difficult to process on blown film extrusion equipment, since the inherent low melt strength of these polymers causes bubble instability and poor film gauge control. The range of processing conditions for polypropylene is quite narrow and difficult to control. The addition of an ethylene copolymer, such as an ethylene/ propylene copolymer, aids in control of the film bubble, since ethylene homopolymers and copolymers process well on this type of equipment. However, the processing of such copolymers is still quite sensitive.

U.S. Pat. No. 5,318,842 discloses a film or sheet comprising (a) a film or sheet of a crystalline homopolymer of a 3–10 carbon alpha-olefin monomer or certain propylene copolymers, and (b) at least one surface layer of a broad molecular weight distribution propylene polymer material. The multilayer films are coextruded and biaxially oriented. U.S. Pat. No. 5,409,992 discloses blends of (a) a heterophasic olefin polymer material, and (b) a broad molecular weight distribution propylene polymer material, and their use for making calendered films and sheets. Neither of these references discloses the manufacture of blown film from broad molecular weight distribution propylene polymer materials.

A propylene polymer that could be used to produce blown film with a stable film bubble and the capability for tight film gauge control would be desirable.

SUMMARY OF THE INVENTION

The film or sheet material of this invention comprises a broad molecular weight distribution propylene polymer material having a molecular weight distribution $M_w/M_n$ of about 4 to about 60, a melt flow rate of about 0.5 to about 50 dg/min, and xylene insolubles at 25° C. of greater than or equal to 94%, wherein the film or sheet is a blown film or sheet. The broad molecular weight distribution propylene polymer material can be, for example, a broad molecular weight distribution propylene homopolymer, or an ethylene/ propylene rubber impact-modified propylene homopolymer, wherein the propylene homopolymer has a broad molecular weight distribution.

The broad molecular weight distribution propylene polymer material has increased melt strength and modulus compared to previously available propylene homopolymer. It has been found that this polymer can be used to produce blown film, since a stable film bubble is formed and film gauge can be controlled. Blown films made from a blend of this broad molecular weight distribution propylene polymer material and a heterophasic olefin polymer composition have increased impact and tear resistance.

DETAILED DESCRIPTION OF THE INVENTION

The propylene polymer material used for making the blown film of this invention has a broad molecular weight distribution $M_w/M_n$ of about 4 to about 60, preferably about 4 to about 20; a melt flow rate of about 0.5 to about 50 dg/min, preferably about 0.5 to about 2 dg/min, and xylene insolubles at 25° C. of greater than or equal to 94%, preferably greater than or equal to 96%. This broad molecular weight distribution polymer has increased melt strength and modulus compared to currently available propylene homopolymer. For example, currently available propylene homopolymer has a flexural modulus of about 240,000 to 250,000 psi, while the propylene homopolymer used for making the blown films of this invention typically has a flexural modulus of about 300,000 psi.

The broad molecular weight distribution propylene polymer material can be, for example, a broad molecular weight propylene homopolymer, or an ethylene/propylene rubber impact-modified broad molecular weight distribution propylene homopolymer. When the propylene polymer material is an ethylene/propylene rubber impact-modified broad molecular weight distribution propylene homopolymer, the propylene homopolymer has the same properties as those listed in the previous paragraph, i.e., a molecular weight distribution $M_w/M_n$ of about 4 to about 60, preferably about 4 to about 20; a melt flow rate of about 0.5 to about 50 dg/min, preferably about 0.5 to about 2 dg/min, and xylene insolubles at 25° C. of greater than or equal to 94%, preferably greater than or equal to 96%.

The broad molecular weight distribution propylene polymer material described above can be prepared by sequential polymerization in at least two stages, in the presence of a Ziegler-Natta catalyst supported on magnesium halides in active form. Preferably the catalyst contains as an essential element a solid catalyst component (a) comprising a titanium compound having at least one titanium-halogen bond, and an electron donor compound, both supported on a magnesium halide in active form. The catalyst is capable of producing propylene polymers having a xylene insolubles fraction at 25° C. greater than or equal to 94%, preferably greater than or equal to 96%, and has a sensitivity to molecular weight regulators high enough to produce propylene homopolymer having a melt flow rate (MFR) of less than or equal to 0.5 and greater than or equal to 50 dg/min.

The catalysts used are obtained by contacting (a) the solid catalyst component mentioned above, (b) an aluminum alkyl compound, and (c) an external electron donor compound.

Solid catalyst components (a) having the characteristics mentioned above are well known in the patent literature. Particularly suited are the solid catalyst components described in U.S. Pat. No. 4,339,054 and European Patent 45,977. Other examples can be found in U.S. Pat. No. 4,472,524.

In general, the solid catalyst components used in the catalysts comprise, as electron donor compounds, compounds selected from ethers, ketones, and lactones; compounds containing N, P, and/or S atoms, and esters of mono- and dicarboxylic acids.

Particularly suited are the esters of phthalic acid, such as diisobutyl, dioctyl and diphenyl phthalate, and benzyl butyl phthalate; the esters of malonic acid, such as diisobutyl and diethyl malonate; the alkyl and aryl pivalates; the alkyl, cycl oalkyl and aryl maleates; alkyl and aryl carbonates such as diisobutyl carbonate, ethyl phenyl carbonate, and diphenyl carbonate, and the esters of succinic acid, such as mono- and diethyl succinate.

The preparation of these catalysts can be carried out according to several methods. For example, the magnesium halide (anhydrous, i.e., containing less than 1% of water), the titanium compounds, and the electron donor compound can be milled under conditions where the magnesium halide is active. The milled product is then treated one or more times with an excess of $TiCl_4$ at temperatures from 80° to 135° C., after which it is washed repeatedly with a hydrocarbon, such as hexane, until all of the chlorine ions have been removed.

According to another method, the anhydrous magesium halide is preactivated according to known methods, and then caused to react with an excess of $TiCl_4$ containing the electron donor compound in solution. The treatment takes place at temperatures ranging from 80° to 135° C. Optionally, the treatment with $TiCl_4$ is repeated, and the solid washed with hexane, or another hydrocarbon solvent, in order to eliminate all traces of unreacted $TiCl_4$.

According to another method, a $MgCl_2 \cdot nROH$ adduct (in particular in the form of spheroidal particles), where n is generally from 1 to 3, and ROH is ethanol, butanol, or isobutanol, is reacted with an excess of $TiCl_4$ containing the electron donor compound in solution. The temperature generally ranges from 80° C. to 120° C. The solid is then isolated and reacted once more with the $TiCl_4$, after which it is separated and washed with a hydrocarbon until all chlorine ions have been removed.

According to another method, magnesium alcoholates and chloroalcoholates (particularly the chloroalcoholates prepared according to the method described in U.S. Pat. No. 4,220,554) are reacted with an excess of $TiCl_4$ containing the electron donor compound in solution, carried out according to the reaction conditions described above.

In the solid catalyst component (a), the titanium compound expressed as Ti is generally present in a percentage ranging from 0.5 to 10% by weight. The quantity of electron donor compound that remains fixed on the solid component (internal donor), generally ranges from 5 to 20 mole % with respect to the magnesium dihalide.

The titanium compounds that can be used for the preparation of the solid catalyst component (a) are the halides and the halogen alcoholates. Titanium tetrachloride is the preferred compound. Satisfactory results can also be obtained with titanium trihalides, particularly $TiCl_3OR$, where R is a phenyl radical.

The reactions indicated above bring about the formation of magnesium halide in active form. Besides these reactions, other reactions are known in the literature that cause the formation of activated magnesium halide starting from magnesium compounds other than the halides, such as carboxylates of magnesium, for example.

The active form of the magnesium halides in the catalyst component (a) can be identified by the X-ray spectrum of the catalyst component wherein the major intensity reflection, which appears on the spectrum of the nonactivated magnesium chloride (having a surface area smaller than 3 m²/g), is no longer present, but in its place there is a halo with the maximum intensity shifted with respect to the position of the major intensity reflection of the nonactivated magnesium dihalide, or by the fact that the major intensity reflection shows a width at half-height at least 30% greater than the one of the major intensity reflection that appears in the nonactivated magnesium chloride spectrum.

The most active forms are those where the halo mentioned above appears in the X-ray spectrum of the component.

Among the magnesium halides, the chloride is the preferred compound. In the case of the most active forms of magnesium chloride, the X-ray spectrum of the catalyst component shows a halo instead of the reflection that in the spectrum of the nonactivated chloride appears at a distance of 2.56 Å.

The aluminum alkyl compounds (b) used as co-catalysts comprise the aluminum trialkyls, such as Al triethyl, Al isobutyl, Al-tri-n-butyl, and linear or cyclic aluminum alkyl compounds containing two or more aluminum atoms bonded through O or N atoms, or $SO_4$ and $SO_3$ groups.

Examples of these compounds are:

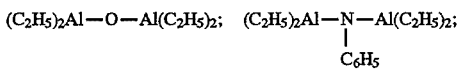

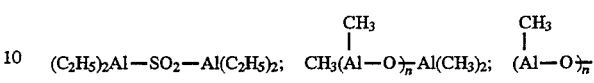

where n is a number from 1 to 20.

The aluminum alkyl compound is generally used in such quantities that the Al/Ti ratio ranges from 1 to 1000.

In addition to the solid catalyst component (a) and the aluminum alkyl compound (b), the catalysts contain an external electron donor compound (c). The external electron donor compound is selected from silanes capable of conferring to the polymer product produced by the catalyst the levels of stereospecificity mentioned above (determined by the high content of xylene insolubles at 25° C.) and sensitivity to whatever molecular weight regulator is used.

Suitable for this purpose are the silanes containing at least one cyclopentyl group bonded to the silicon, and one or more —OR groups also bonded to the silicon atom, where R is a 1–18 carbon alkyl, 3–18 carbon cycloalkyl, 6–18 carbon aryl, or 7–18 carbon aralkyl radical. Preferably R is methyl or ethyl. Particularly suited is dicyclopentyldimethoxysilane. The external donors mentioned above are generally used in quantities ranging from 0.001 to 15 moles, preferably from 1 to 10 moles with respect to the moles of aluminum alkyl compound (b).

The sequential polymerization is carded out in the presence of the above catalysts, and the polymerization occurs in at least two stages. Fraction (A) and (B) are prepared in separate and consecutive stages, in each stage in the presence of the polymer and the catalyst from the preceding stage.

The polymerization process can be carried out in a batch or continuous mode according to known techniques, operating in liquid phase in the presence or absence of an inert diluent, or in gas phase, or liquid-gas phase. Gas phase is preferred.

The polymerization reaction times and temperatures are not critical, however, it is preferred that the polymerization is carried out at a temperature of from 20° C. to 100° C.

The regulation of the molecular weight is controlled using known regulators, particularly hydrogen.

The catalysts can be precontacted with small quantities of olefins (prepolymerization). Prepolymerization improves both catalyst activity and polymer morphology.

Prepolymerization is carried out by maintaining the catalyst in suspension in a hydrocarbon (hexane or heptane, for example) for a period of time that is sufficient to produce a quantity of polymer ranging from 0.5 to 3 times the weight of the solid component. The polymerization temperature is between ambient temperature and 60° C. Prepolymerization can also be carried out in liquid propylene under the temperature conditions described above. Quantities of polymer that can reach 1000 g per g of catalyst component are produced.

The broad molecular weight distribution propylene homopolymer can also be blended with about 10% to about 90% by weight, based on the total weight of the composition, of a heterophasic olefin polymer composition to give a film with increased impact and tear resistance. The amount of heterophasic olefin polymer composition used depends upon the film properties that are desired. The heterophasic olefin polymer composition is prepared by polymerization in at least two stages and comprises (a) from about 10 to about 50 parts of a propylene homopolymer having an isotactic index greater than 80, or a copolymer selected from the group consisting of (i) propylene and ethylene, (ii) propylene, ethylene and a $CH_2=CHR$ alpha-olefin, where R is a $C_{2-8}$ straight or branched alkyl, and (iii) propylene and an alpha-olefin as defined in (ii), said copolymer containing over 80% propylene and having an isotactic index greater than 80;

(b) from about 5 to about 20 parts of a semi-crystalline, essentially linear copolymer fraction having a crystallinity of about 20% to about 60%, wherein the copolymer is selected from the group consisting of (i) ethylene and propylene containing over 55% ethylene, (ii) ethylene, propylene, and an alpha-olefin as defined in (a) (ii) containing from 1 to 10% of the alpha-olefin and over 55% of both ethylene and alpha-olefin, and (iii) ethylene and an alpha-olefin as defined in (a) (ii) containing over 55% of said alpha-olefin, which copolymer is insoluble in xylene at room or ambient temperature; and (c) from about 40 to 80 parts of a copolymer fraction wherein the copolymer is selected from the group consisting of (i) ethylene and propylene containing from 20% to less than 40% ethylene, (ii) ethylene, propylene, and an alpha-olefin as defined in (a) (ii), wherein the alpha-olefin is present in an amount of 1 to 10% and the amount of ethylene and alpha-olefin present is from 20% to less than 40%, and (iii) ethylene and an alpha-olefin as defined in (a) (ii) containing from 20% to less than 40% of said alpha-olefin, and optionally with 0.5 to 10% of a diene, said copolymer fraction being soluble in xylene at ambient temperature, and having an intrinsic viscosity of from 1.5 to 4.0 dl/g;

with the total of the (b) and (c) fractions, based on the total olefin polymer composition, being from about 50% to about 90%, and the weight ratio of (b)/(c) being less than 0.4, wherein said composition has a flexural modulus of less than 150 MPa.

The preparation of the heterophasic olefin polymer composition is disclosed in U.S. Pat. No. 5,212,246, the process of which is incorporated herein by reference.

The film or sheet material of this invention can also contain various additives known to those skilled in the art, such as, for example, fillers such as talc and calcium carbonate, pigments, antioxidants, slip agents, and antiblock agents.

The melt flow rate of the propylene polymer material was measured using ASTM D-1238, condition L.

Xylene insolubles were determined by dissolving 2 g of polymer in 200 ml of xylene at 135° C., cooling in a constant temperature bath to 22° C., and filtering through fast filter paper. An aliquot of the filtrate was evaporated to dryness, the residue weighed, and the weight % soluble fraction calculated.

Molecular weight distribution $M_w/M_n$ was determined using a Waters 150-C ALC/gel permeation chromatograph in trichlorobenzene at 145° C. with a differential refractive index detector.

The film-forming material was stabilized with 0.1 pph calcium stearate, 0.2 pph Irganox B225 stabilizer available from Ciba Geigy (a 1:1 blend of Irgafos 168 phosphite stabilizer and Irganox 1010 hindered phenolic stabilizer), 0.3 pph Sylobloc 45 antiblocking agent, available from W. R. Grace, and 0.3 pph Kemamide E slip additive, available from Croda. The air quenched blown film was prepared by charging the composition into a single screw extruder, extruding it through a circular die and blowing it into a film with a sufficient amount of air to provide a film of either 1 or 2 mils thickness using the following equipment and processing conditions. In the table, fpm=feet per minute.

| Barrel Temperature Profile | |
| --- | --- |
| Zone 1 | 410° F. |
| Zone 2 | 410° F. |
| Zone 3 | 410° F. |
| Zone 4 | 410° F. |
| Die temperature | 425° F. |
| Melt temperature | 430° F. |
| Die pressure | 1500 psi |
| Die gap | 0.038 in |
| Line speed | 51 fpm |

Although air quenched films were produced and tested in the following examples, it should be noted that the films could also have been subjected to water quenching instead of air quenching.

The tests used to measure the properties of the resulting film were: tensile strength at yield (ASTM D-638), tensile strength at break (ASTM D-638), tensile elongation at yield (ASTM D-638), tensile elongation at break (ASTM D-638), dart drop impact (ASTM D-4272-83), and 2% secant modulus (ASTM D-882).

In this specification all parts and percentages are by weight unless otherwise noted.

EXAMPLE 1

A film having a thickness of 1 mil was prepared as described above from a broad molecular weight distribution propylene homopolymer having a MFR of 3.8 dg/min, 98.4% insolubles in xylene at room temperature, and $M_w/M_n=13.9$. The physical properties of the film are given in Table 1.

TABLE 1

| Tensile Strength @ Yield | |
| --- | --- |
| MD (psi) | 6,330 |
| CD (psi) | 4,900 |
| Tensile Elongation @ Yield | |
| MD (%) | 4.4 |
| CD (%) | 3.1 |
| Tensile Strength @ Break | |
| MD (psi) | 10,965 |
| CD (psi) | 4,900 |
| Tensile Elongation @ Break | |
| MD (%) | 460 |
| CD (%) | 3 |
| 2% Secant Modulus | |
| MD (psi) | 198,570 |
| CD (psi) | 176,400 |

EXAMPLE 2

Films having thicknesses of 1 mil and 2 mils were prepared from blends of broad molecular weight distribution propylene homopolymer and a heterophasic olefin polymer composition, using varying amounts of the two components of the blend. The amounts of each component in the blend and the physical properties of films made from the blends are given in Table 2. The additives and extrusion processing conditions were the same as in Example 1.

In the table, A is a heterophasic olefin polymer composition having a melt flow rate of 0.8 dg/min. The propylene homopolymer content of the heterophasic composition is 35%, the content of semi-crystalline, linear ethylene copolymer fraction is 5%, and the content of the ethylene copolymer fraction soluble in xylene is 60% by weight, based on the total weight of the composition. B is a broad molecular weight distribution propylene homopolymer having a MFR of 1.2 dg/min, a molecular weight distribution $M_w/M_n$ of 4.2, and xylene insolubles at 25° C. of 98.7%.

TABLE 2

| Ratio of polymers in blend (A/B) (%) | 30/70 | 30/70 | 50/50 | 50/50 | 70/30 | 70/30 |
|---|---|---|---|---|---|---|
| Film Thickness (mils) | 1.00 | 2.00 | 1.00 | 2.00 | 1.00 | 2.00 |
| Dart Drop Impact (grams) | <45 | 59 | 51 | 201 | 108 | 300 |
| Elmendorf Tear Strength MD/CD (grams) | 2/420 | 12/630 | 5/450 | 19/570 | 5/620 | 27/760 |
| Tensile Strength @ Yield MD/CD (psi) | 6000/4370 | 4830/3760 | 5390/3200 | 4210/3210 | 4280/2420 | 3070/2260 |
| Tensile Strength @ Break MD/CD (psi) | 10300/4390 | 8500/3930 | 12370/3210 | 8200/3740 | 10100/3040 | 500/2960 |
| Elongation @ Yield MD/CD (%) | 34/6 | 30/8 | 44/12 | 39/17 | 48/16 | 46/26 |
| Elongation @ Break MD/CD (%) | 441/41 | 540/520 | 530/540 | 540/540 | 480/540 | 540/540 |
| 2% Secant Modulus MD/CD (psi) | 144,000/138,000 | 117,000/116,000 | 88,000/94,000 | 83,000/85,000 | 59,000/65,000 | 51,000/53,000 |

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

We claim:

1. A film or sheet material comprising a broad molecular weight distribution propylene polymer material selected from the group consisting of a broad molecular weight distribution propylene homopolymer and an ethylene/propylene rubber impact-modified broad molecular weight distribution propylene homopolymer, the broad molecular weight distribution propylene polymer material having a molecular weight distribution $M_w/M_n$ of about 4 to about 60, a melt flow rate of about 0.5 to about 50 dg/min, and xylene insolubles at 25° C. of greater than or equal to 94%, wherein the film or sheet is a blown film or sheet.

2. The film or sheet of claim 1, wherein the film or sheet material additionally comprises from about 10% to about 90%, based on the total weight of the composition, of a heterophasic olefin polymer composition prepared by polymerization in at least two stages and comprising (a) from about 10 to about 50 parts of a propylene homopolymer having an isotactic index greater than 80, or a copolymer selected from the group consisting of (i) propylene and ethylene, (ii) propylene, ethylene and a $CH_2=CHR$ alpha-olefin, where R is a $C_{2-8}$ straight or branched alkyl, and (iii) propylene and an alpha-olefin as defined in (ii), said copolymer containing over 80% propylene and having an isotactic index greater than 80;

(b) from about 5 to about 20 parts of a semi-crystalline, essentially linear copolymer fraction having a crystallinity of about 20% to about 60%, wherein the copolymer is selected from the group consisting of (i) ethylene and propylene containing over 55% ethylene, (ii) ethylene, propylene, and an alpha-olefin as defined in (a) (ii) containing from 1 to 10% of the alpha-olefin and over 55% of both ethylene and alpha-olefin, and (iii) ethylene and an alpha-olefin as defined in (a) (ii) containing over 55% of said alpha-olefin, which copolymer is insoluble in xylene at room or ambient temperature; and (c) from about 40 to 80 parts of a copolymer fraction wherein the copolymer is selected from the group consisting of (i) ethylene and propylene containing from 20% to less than 40% ethylene, (ii) ethylene, propylene, and an alpha-olefin as defined in (a) (ii), wherein the alpha-olefin is present in an amount of 1 to 10% and the amount of ethylene and alpha-olefin present is from 20% to less than 40%, and (iii) ethylene and an alpha-olefin as defined in (a) (ii) containing from 20% to less than 40% of said alpha-olefin, and optionally with 0.5 to 10% of a diene, said copolymer fraction being soluble in xylene at ambient temperature, and having an intrinsic viscosity of from 1.5 to 4.0 dl/g;

with the total of the (b) and (c) fractions, based on the total olefin polymer composition, being from about 50% to about 90%, and the weight ratio of (b)/(c) being less than 0.4, wherein said composition has a flexural modulus of less than 150 MPa.

3. The film or sheet of claim 1, wherein the broad molecular weight distribution propylene polymer material is a propylene homopolymer, the molecular weight distribution of the propylene homopolymer is about 7 to about 20, the melt flow rate is about 0.5 to about 2 dg/min, and the xylene insolubles at 25° C. are greater than or equal to 96%.

4. The film or sheet of claim 2, wherein the broad molecular weight distribution propylene polymer material is a propylene homopolymer, the molecular weight distribution of the propylene hompolymer is about 7 to about 20, the melt flow rate is about 0.5 to about 2 dg/min, and the xylene insolubles at 25° C. are greater than or equal to 96%.

* * * * *